(12) United States Patent
Gibb et al.

(10) Patent No.: US 6,211,779 B1
(45) Date of Patent: *Apr. 3, 2001

(54) VARIABLE SPEED WARNING DEVICE

(75) Inventors: Richard G. Gibb, Olympia Fields; Paul D. Graham, La Grange Park, both of IL (US)

(73) Assignee: Federal Signal Corporation, University Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/310,637

(22) Filed: Sep. 22, 1994

(51) Int. Cl.[7] ........................................... B06Q 1/54
(52) U.S. Cl. ........................ 340/466; 340/464; 340/467
(58) Field of Search ........................... 340/463, 464, 340/466, 467, 468, 472, 473, 474, 479, 435, 903

(56) References Cited

U.S. PATENT DOCUMENTS

| 1,543,704 | 6/1925 | Evelyn | 340/466 |
|---|---|---|---|
| 1,589,071 | 6/1926 | Hahnle | 340/466 |
| 2,681,957 | 6/1954 | Schneider | 200/81.9 R |
| 2,794,082 | 5/1957 | Germaine | 200/52 R |
| 2,903,684 | 9/1959 | McClintock | 340/466 |
| 3,431,556 | 3/1969 | Johnson | 340/467 |
| 3,631,390 * | 12/1971 | Murphy | 340/466 |
| 3,691,525 | 9/1972 | McClellan, Sr. et al. | 340/466 |
| 3,710,315 | 1/1973 | Scherenberg | 340/466 |
| 3,748,642 | 7/1973 | Radin et al. | 340/466 |
| 3,771,122 | 11/1973 | Sattler | 340/466 |
| 3,774,152 | 11/1973 | Tandy | 340/464 |
| 3,829,828 | 8/1974 | Hutchinson et al. | 340/466 |
| 3,860,905 | 1/1975 | Guerini | 340/466 |
| 3,919,689 * | 11/1975 | Despain | 340/466 |
| 3,930,225 | 12/1975 | Mollico | 340/466 |
| 3,952,689 | 4/1976 | Joubert . | |
| 4,019,171 | 4/1977 | Martelet | 340/432 |
| 4,189,706 | 2/1980 | Knox | 340/466 |
| 4,281,311 | 7/1981 | Gosswiller . | |
| 4,320,384 * | 3/1982 | Carlson | 340/467 |
| 4,357,594 * | 11/1982 | Ehrlich et al. | 340/467 |
| 4,491,824 | 1/1985 | Chiou | 340/467 |
| 4,635,039 | 1/1987 | Gosswiller | 340/471 |
| 4,831,357 | 5/1989 | Miller | 340/472 |
| 4,894,641 * | 1/1990 | Yang | 340/466 |
| 5,012,221 | 4/1991 | Neuhaus et al. | 340/384.5 |
| 5,140,304 | 8/1992 | Miller | 340/472 |
| 5,296,840 * | 3/1994 | Gieffers | 340/472 |
| 5,355,119 | 10/1994 | Pearlman | 340/468 |

FOREIGN PATENT DOCUMENTS

| 2447241 | 4/1976 | (DE) . |
|---|---|---|
| 2230187 | 12/1974 | (FR) . |

* cited by examiner

*Primary Examiner*—Edward Lefkowitz
(74) *Attorney, Agent, or Firm*—Leydig, Voit & Mayer, Ltd.

(57) ABSTRACT

Method and apparatus for increasing the effectiveness of emergency signalling devices on vehicles. An emergency signalling device such as a flashing light is repeatedly operated at a frequency rate that corresponds to the speed of the vehicle. A minimum repetition rate is employed when the vehicle is slow or stopped so that the signal is not similarly halted, and a maximum rate is employed above a certain speed so that the repetition rate is not at too high of a frequency to be perceived.

22 Claims, 8 Drawing Sheets

| SPEED (MPH) | DELAY VARBL |
|---|---|
| 07 | 12500 |
| 08 | 12500 |
| 09 | 12500 |
| 10 | 12500 |
| 11 | 10592 |
| 12 | 9191 |
| 13 | 8116 |
| 14 | 7267 |
| 15 | 6579 |
| 16 | 6009 |
| 17 | 5531 |
| 18 | 5123 |
| 19 | 4771 |
| 20 | 4464 |
| ... | ... |
| 40 | 1953 |
| 41 | 1900 |
| 42 | 1849 |
| 43 | 1801 |
| 44 | 1756 |
| 45 | 1712 |
| 46 | 1671 |
| 47 | 1632 |
| 48 | 1594 |
| 49 | 1559 |
| 50 | 1524 |
| 51 | 1492 |
| 52 | 1460 |
| 53 | 1430 |
| 54 | 1401 |
| 55 | 1374 |
| 56 | 1347 |
| 57 | 1321 |
| 58 | 1297 |
| 59 | 1273 |
| 60 | 1250 |
| 61 | 1250 |
| 62 | 1250 |
| 63 | 1250 |
| 64 | 1250 |

FIG. 8

VARIABLE SPEED WARNING DEVICE

FIELD OF THE INVENTION

The invention relates generally to emergency signalling devices, and more particularly to an signalling method and apparatus for an emergency vehicle having a signalling frequency corresponding to the speed of the vehicle.

BACKGROUND OF THE INVENTION

Emergency vehicles such as police cars, ambulances and fire trucks are required to perform under a wide range of driving conditions and at a wide range of speeds. For example, during the time that a police car is in pursuit of a suspect car, the police car may be driven at a high rate of speed for a given time, at a reduced speed while crossing critical intersections, and stopped once the vehicle is halted.

Under these varying conditions, the primary responsibility of the emergency signalling system is to warn the public of the presence of the vehicle, since the emergency vehicle is often driven in a non-standard manner during such extraordinary times. To effectively warn the public, conventional lights and sirens provide recognizable patterns and various colors or tones.

In essence, the flashing or strobing lights of the vehicle are broadcasting information to potential observers such that once detected, the observer is warned of the abnormal driving conditions that may soon be encountered so that appropriate precautionary measures may be taken. For example, light bars, composed of anywhere from two to twelve light elements, wherein each element is ordinarily capable of flashing at a rate of between 60 and 240 flashes per minute (one to four hertz), may be attached to vehicles to broadcast the warning information, as standardized by the Society of Automotive Engineers (SAE J-845, SAE J-595, SAE J-1318) for emergency warning lights. The lights may be filtered so that non-white colors allow the observer to differentiate between the white and red lights of ordinary vehicles and also to differentiate between the types of emergency vehicles. In short, the combination of flashing or strobing lights, at a particular pattern and of a distinguishable color signifies to the public the presence of an active emergency vehicle.

In general, a warning issued by an emergency signalling device attempts to maximize the effectiveness of the warning by including enough information to overcome observational difficulties that are potentially present in the general public. For example, emergency sirens often sweep through a range of frequencies at varying rates. The maximum and minimum frequencies are arranged so as to be within the most efficient detection portion of the human audio spectrum. The purpose of sweeping through a range of frequencies is to ensure that potential human observers will hear the siren over background noises and because many potential observers suffer from hearing loss at certain frequencies.

The rate of sweeping between the frequencies is also chosen to impart information, usually indicative of urgency, to the public. For example, a frequency pattern known as a "Wail" sweeps from approximately a 500 hertz tone to a 1500 hertz tone in ten to thirty sweeps per minute. A frequency pattern known as a "Yelp" sweeps between the same audible tones but at a much faster rate of approximately 150 to 250 sweeps per minute. Thus, the "Yelp" pattern is able to rapidly impart the signalling information, even to persons having limited ability to hear certain frequencies, so that a faster reaction than with the "Wail" tone is possible.

Parallel concepts are available in emergency lighting devices as well. For example, light bars provide a variety of colors in a single light package. These varying colors aid the stimulation of unoccupied visual channels in human observers and overcome visual deficiencies such as color blindness present in some potential observers. Additionally, having a greater number of flashing light elements provides a greater number of flashes to the eye, which potentially results in faster reaction times.

However, even when such flashes are noticed, the speed of the vehicle is somewhat uncertain until the vehicle itself is visually detected from a relatively close range. To some extent, with audible sirens an increase or decrease in volume in conjunction with the frequency shift resulting from the Doppler effect provide some hint of vehicle's relative speed and direction (i.e., velocity) to most observers, however there is no consistent pattern provided thereby that such observers can ordinarily recognize in any significant time. Moreover, non-stationary observers influence these effects with their own velocity, making it even more difficult to deduce an emergency vehicle's velocity from its siren when in motion relative to it. This is because the frequency shift and amplitude change over time will be different to a stationary observer, to an observer moving toward the vehicle and to an observer moving away from the vehicle.

OBJECTS AND SUMMARY OF THE INVENTION

Accordingly, it is an object of the present invention to provide a method and apparatus for increasing the effectiveness of emergency signalling devices on vehicles by varying the frequency of the device in dependence on the speed of the vehicle.

A further object of the invention is to provide a method and apparatus of the above kind that enables an observer to determine the speed of a vehicle by observing signals produced by the signalling device.

Another object of the invention is to provide a method and apparatus as characterized above that varies the frequency between a maximum and minimum rate.

Briefly, the invention provides an emergency signalling device for broadcasting emergency signals from a vehicle. Mounting means connect the signalling device to the vehicle, and a detector converts the speed of the vehicle to a first electrical signal having information therein corresponding to the speed of the vehicle. Circuitry converts the first electrical signal to a second electrical signal having a repetition rate corresponding to the speed of the vehicle, and circuitry is also provided for maintaining the repetition rate between maximum and minimum rates. Means connect the second electrical signal to the signalling device for broadcasting emergency signals having a variable range of repetition rates corresponding to the speed of the vehicle between maximum and minimum signalling rates.

In one preferred embodiment, the emergency signalling device is provided in an emergency lighting device mounted to the surface of a motor vehicle. The signalling device includes a base and related apparatus for mounting to the surface of the motor vehicle, a flashing light mounted to the base, and a light transmissive housing supported by the base for enclosing and protecting the light. A detector detects the speed of the vehicle, and circuitry responsive thereto controls a flash rate of the flashing light so that the rate varies with the speed of the vehicle between minimum and maximum flash rates.

A method of operating emergency signalling devices mounted to a motor vehicle is also provided, the method comprising the step of generating an emergency signal that is characterized by a repetition of at least one audio tone or the flashing of lights. The rate of repetition of the emergency signal is maintained at a minimum value for speeds of the motor vehicle below a predetermined lower limit and at a maximum value for speeds of the motor vehicle above a predetermined upper limit, and the repetition rate of the emergency signal is adjusted to create a proportional relationship between the repetition rate and the speed of the vehicle for speeds between the lower and upper limits.

Other objects and advantages will become apparent from the following detailed description when taken in conjunction with drawings, in which:

BRIEF DESCRIPTION OF THE DRAWINGS

FIG. 8 is a look-up table containing delay variables which provide the linear function of FIG. 7;

Figure 1:
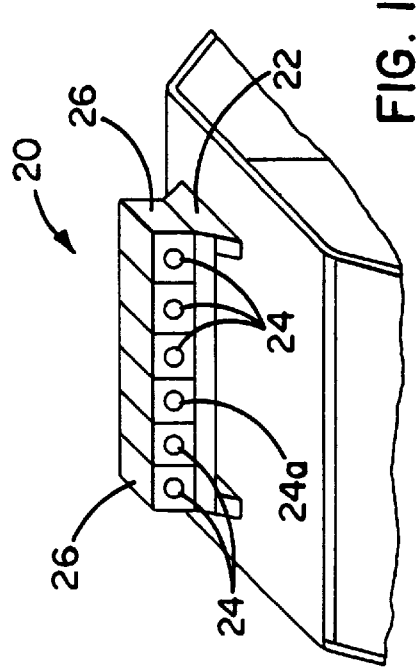
FIG. 1 is a perspective view illustrating an emergency lighting device mounted to a vehicle according to one embodiment of the present invention.

While the invention is amenable to various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, there is shown an emergency signalling device generally designated 20 including a base 22 and incorporated mounting apparatus for mounting to a surface of a motor vehicle, ordinarily the motor vehicle's roof, and a plurality of light sources 24, 24a mounted to the base 22. The base 22 supports a light housing 26 which is dimensioned to enclose and protect the light sources 24, 24a, the light housing 26 being transmissive to at least one frequency of light generated by the light sources 24, 24a. Although the exemplified signalling device is illustrated as a plurality of light sources 24, 24a within a light bar, it can readily be appreciated that virtually any base, housing and light source design will suffice for the purposes of the present invention. Alternatively, the base 22 may be arranged to mount one or more speakers 24c to the vehicle.

According to one aspect of the invention, a signalling device 20 (FIG. 4) is controllably driven to impart speed-dependent information to observers during an emergency situation. In one embodiment of the invention, such as in FIG. 2, the signalling device 20 includes at least one light source such as the single light source 24a, which is capable of being intermittently illuminated by a drive means 28, for example, a suitably connected transistor, relay, silicon controlled rectifier, mechanical switch, or the like. In a second embodiment of the invention, shown in FIG. 3, a motor 30 is utilized to rotate a constant directional light source 24b such that it appears to be intermittently flashing. It yet another embodiment, a speaker 24c (FIG. 9) is controllably driven with one or more audible frequencies. To trigger the driving circuitry 28 to controllably flash or rotate the light source, or to drive a speaker, a suitable driving circuit is employed.

FIGS. 2–4 and 9–10 show examples of possible electrical driving circuits capable of controlling the operation of the signalling device 20 according to the invention. For simplicity herein, detector 32 is assumed to provide a voltage output having a magnitude that substantially corresponds to the speed of the vehicle, at least within the speed ranges described herein. For example, the speed-dependent voltage might be obtained by an appropriate electrical connection to a standard voltage-driven speedometer. Additionally, if necessary, the voltage obtained from the detector 32 may first be conditioned, for example, amplified, attenuated, or filtered to remove noise or other voltage spikes, before being utilized.

Alternatively, the detector 32 might instead be a radar or laser speed gun that is arranged to obtain the speed of the vehicle relative to the stationary ground, a magnet connected to the wheel that closes and opens a switch to trigger a counter in accordance with the revolution of a wheel, an air speed detector, and so on.

In any event, for further simplicity herein, the voltage obtained from the detector 32 will be assumed to vary between 0 and 12 volts in direct linear proportion to the speed of the vehicle between 0 and 120 miles per hour. Also for the sake of simplicity, the forward voltage drops of the diodes present in the circuits hereinafter described are disregarded. Finally, the input impedances of the various driving circuits are assumed to be high enough so that the influence of the driving circuits' impedance on the input voltage is negligible.

Figure 2:
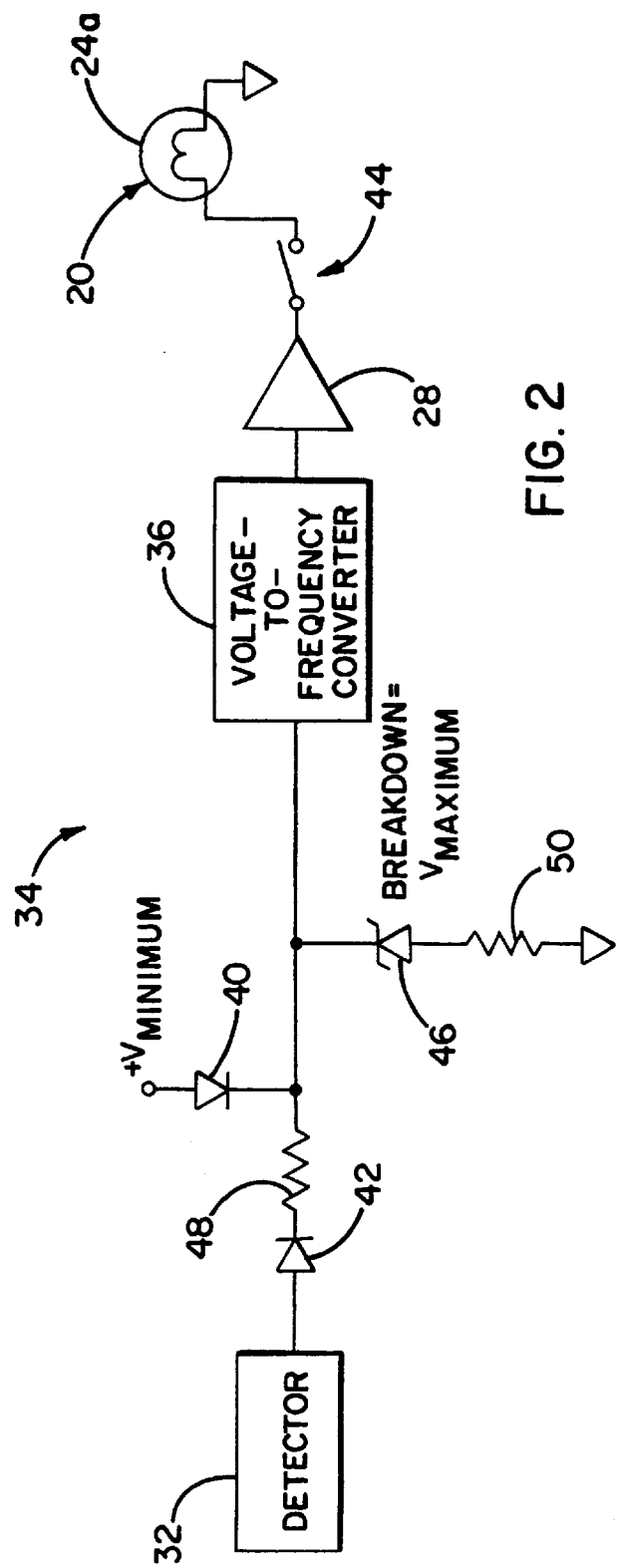
FIG. 2 is a schematic diagram of an electronic circuit employing analog circuitry for accomplishing the invention with a flashing light.

FIG. 2 shows one such suitable driving circuit, generally designated 34, wherein the voltage from the detector 32 is utilized in conjunction with a voltage-to-frequency converter 36 to intermittently flash the light source 24a. In accordance with the invention, the speed of the vehicle, reflected in the output voltage from the detector 32, determines the frequency, i.e, flash rate, of the light source 24a. Because typical emergency light sources require a relatively substantial amount of current during illumination, a driver 28 is employed, for example a relay, transistor, and so on as previously described. Although not necessary to the invention, instead of switching a single light source 24a on-and-off, the signalling device 20 may be arranged to switch between differently colored lights.

It can be readily appreciated that the signalling device 20 will not be effective if the light flashes (or if tones are sounded) too slowly or becomes stopped as the vehicle is slowed or stopped. Similarly, it will also be appreciated that the signalling device 20 would be rendered ineffective it were allowed to transmit information at a rate that was no longer detectable by humans, or even if detectable, was too fast to be effective. For example, a four hertz rate might be deemed to be the maximum rate that is acceptable for still broadcasting an effective warning to a human eye.

Thus, in accordance with one aspect of the invention, when the voltage from the detector 32 drops below a predetermined minimum amount, for example one volt corresponding to ten miles per hour, diode 40 begins to conduct ensuring that at least one volt (V minimum) is always present at the input of voltage-to-frequency converter 36. In order to prevent the minimum voltage from influencing the voltage output by detector 32, (which may, for example be being tapped directly from a speedometer input or the like), a diode 42 blocks current from flowing in the reverse direction.

As a result of the minimum voltage supplied via diode 40 to the input of voltage-to-frequency converter 36, when the vehicle speed is less than a predetermined minimum speed, (for example below ten miles per hour which corresponds to one volt at the output of detector 32), a certain minimum frequency is output by the voltage-to-frequency converter 36. Accordingly, when the light source 24a is turned active, for example by closing an activation switch 44, the light will flash at a minimum frequency that is arranged to be fast enough to be perceived by an ordinary observer. This minimum flash rate takes place even if the vehicle is completely stopped.

Similarly, in accordance with another aspect of the invention, when the voltage from the detector 32 exceeds a predetermined maximum amount, for example six volts corresponding to sixty miles per hour, a zener diode 46 connected to the detector 32 output breaks down and begins to conduct ensuring that no more than six volts is ever present at the input of voltage-to-frequency converter 36. A pair of resistors 48, 50 protect the blocking diode 42 and zener diode 46, respectively, from the voltage drops that result when the zener diode 46 begins to conduct. The values of resistors 48 and 50 are preferably chosen so as to neither draw excessive current nor significantly influence the circuit impedance over the range of all possible input voltages.

As a result of the maximum voltage, when the vehicle speed exceeds a predetermined maximum (for example sixty miles per hour) a certain predetermined maximum frequency is output by the voltage-to-frequency converter 36. Accordingly, even at high speeds the light flashes at a frequency that is arranged to be not too fast to be perceived by an ordinary observer.

Between the minimum and maximum vehicle speeds, the voltage output by the detector 32 remains proportional to the speed, for example four volts for forty miles per hour, three volts for thirty miles per hour, and so on. Neither diode 40 nor zener diode 46 conducts current at these voltages, and thus the output frequency of the voltage-to-frequency converter 36 is proportional to the vehicle speed.

An appropriately arranged voltage-to-frequency converter (voltage controlled oscillator) 36 provides the desired frequencies for the desired input voltages. Moreover, typical voltage-to-frequency converters also provide for selection of an appropriate duty cycle. Thus, for example, the minimum frequency might be selected as 0.4 Hertz (resulting in 24 flashes per minute) and the maximum at four hertz (resulting in 240 flashes per minute, according to the appropriate SAE standard) with a fifty percent duty cycle.

Instead of flashing the light, a light source that radiates light primarily in one direction (or two opposite directions) may be rotated at an appropriate frequency, thus appearing to be flashing when perceived by a relatively stationary observer. To accomplish the speed dependent signalling according to the present invention with a rotating light source, the pulses may be utilized to drive a stepper motor, via an appropriate driver 28, or alternatively a circuit such as the circuit in FIG. 3 may be utilized. Note that identically referenced numerals in FIG. 3 correspond to identically referenced components of FIG. 2 and function similarly.

Figure 3:
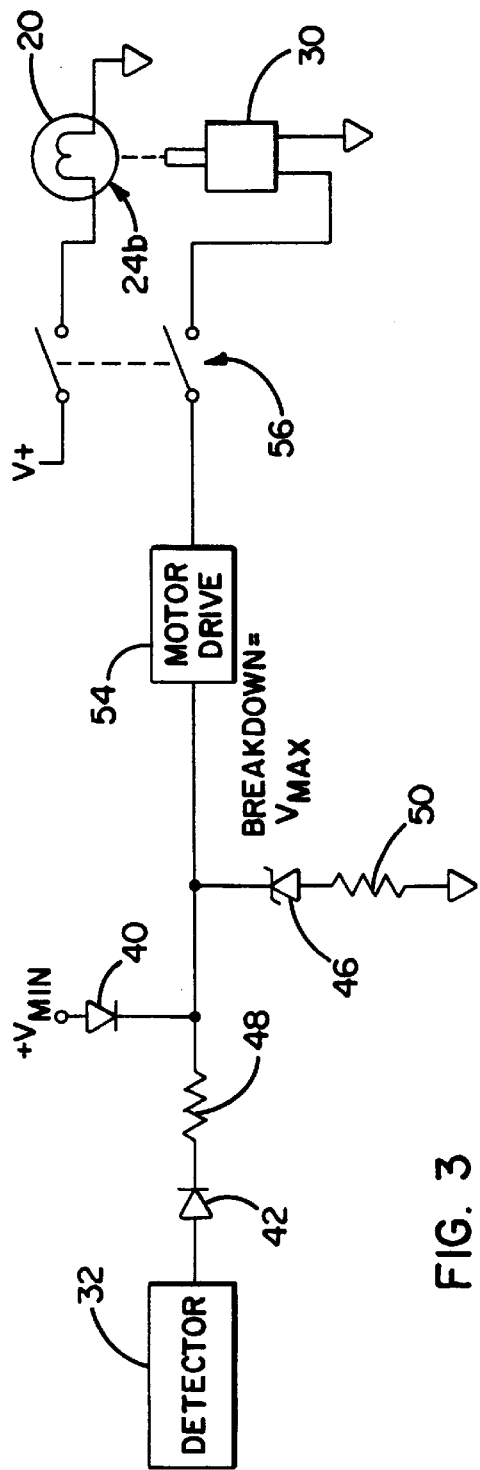
FIG. 3 is a schematic diagram of an electronic circuit employing analog circuitry for accomplishing the invention with a rotating light.

In the circuit of FIG. 3, instead of the speed dependent detector 32 voltage being supplied to a voltage-to-frequency converter to provide pulses, the voltage is used to drive a direct current (DC) motor 30, the motor 30 having a variable speed of rotation dependent on the input voltage. Accordingly, the motor 30, mechanically connected to the light source 24b, rotates the light source 24b in proportion to the speed of the vehicle. As described previously, the voltage is clamped by the diode 40 and the zener diode 46 between maximum and minimum values to ensure that the speed of rotation resulting in the signalling by the light is neither too slow nor too fast to be perceived. To selectively activate and deactivate the emergency signalling apparatus, a switch 56 may be placed such as in FIG. 3 to selectively control both the application of current to the motor 30 and the illumination of the light source 24b.

Because such motors require a relatively substantial amount of current to operate, an appropriate motor drive 54, such as a transistor-based current amplifier is used to supply the necessary current. Moreover, the voltage at the input of the motor drive 54 may be amplified or attenuated as necessary to adjust for the needs of the motor 30, or the motor 30 may be geared to adjust for the voltage. For example, the motor might rotate at 1000 revolutions per minute at twelve volts, 500 revolutions per minute at six volts. To obtain the desired 240 revolutions per minute at six volts, the motor can be geared down at a two-to-one ratio (i.e., 250 revolutions-per-minute at six volts) and the maximum voltage (six volts) attenuated to 5.76 volts. Similarly, if the light source radiates light in two opposite directions, the input voltage can be halved to halve the frequency of rotation.

Figure 4:
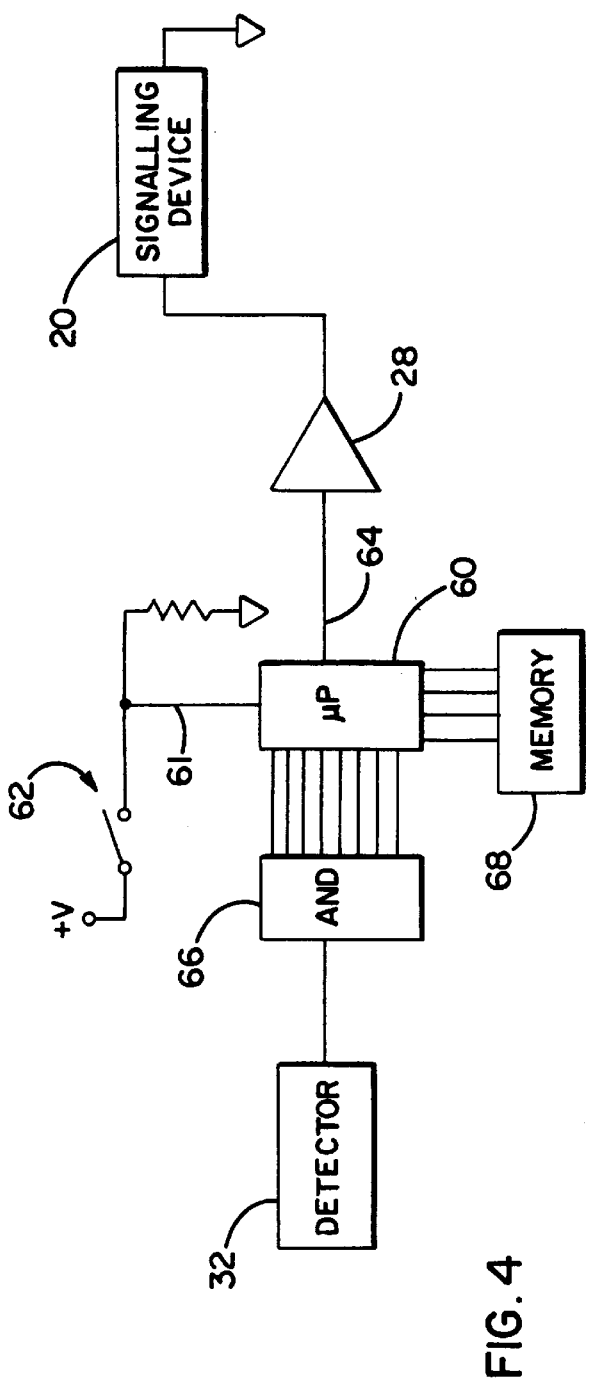
FIG. 4 is a schematic diagram of an alternate electronic circuit employing a microprocessor for accomplishing the invention.

In an alternate embodiment as shown in FIG. 4, a microprocessor 60 is employed to process the speed of the vehicle to output or otherwise control a signal pulse having a frequency ultimately dependent on the speed of the vehicle. The signal pulse is then used to operate the signalling device 20 in accordance therewith. The operation of the microprocessor 60 will be described in conjunction with the flowchart of FIG. 5. Of course, the steps described herein may be implemented as a single routine in a more complex program, thus allowing the light sources 24, 24a to be flashed in any number of additional patterns.

Initially, at step 100, the microprocessor 60 checks the status of an input line 61 to determine if an emergency signalling operation is requested at emergency switch 62. If the emergency switch 62 is not on, the microprocessor clears the appropriate output line 64 to zero at step 102 by appropriately masking an output port thereof (such as by AND-ing the appropriate bit of an eight-bit output port with zero), and loops back to continually await activation.

If the input line 61 indicates the emergency switch 62 has been activated, at step 104 the microprocessor obtains a voltage reading from the detector 32 as sampled by an analog-to-digital voltage converter (A-D converter) 66 (FIG. 4). To prevent the input reading from being obtained while the A–D converter 66 is converting the most recent sample, a suitable latch might be employed, or alternatively, the microprocessor 60 could trigger the voltage sample by outputting an appropriate timing pulse, and subsequently delay long enough to ensure that the conversion was complete before the A–D converter 66 output data was read into the microprocessor 60.

Figure 5:
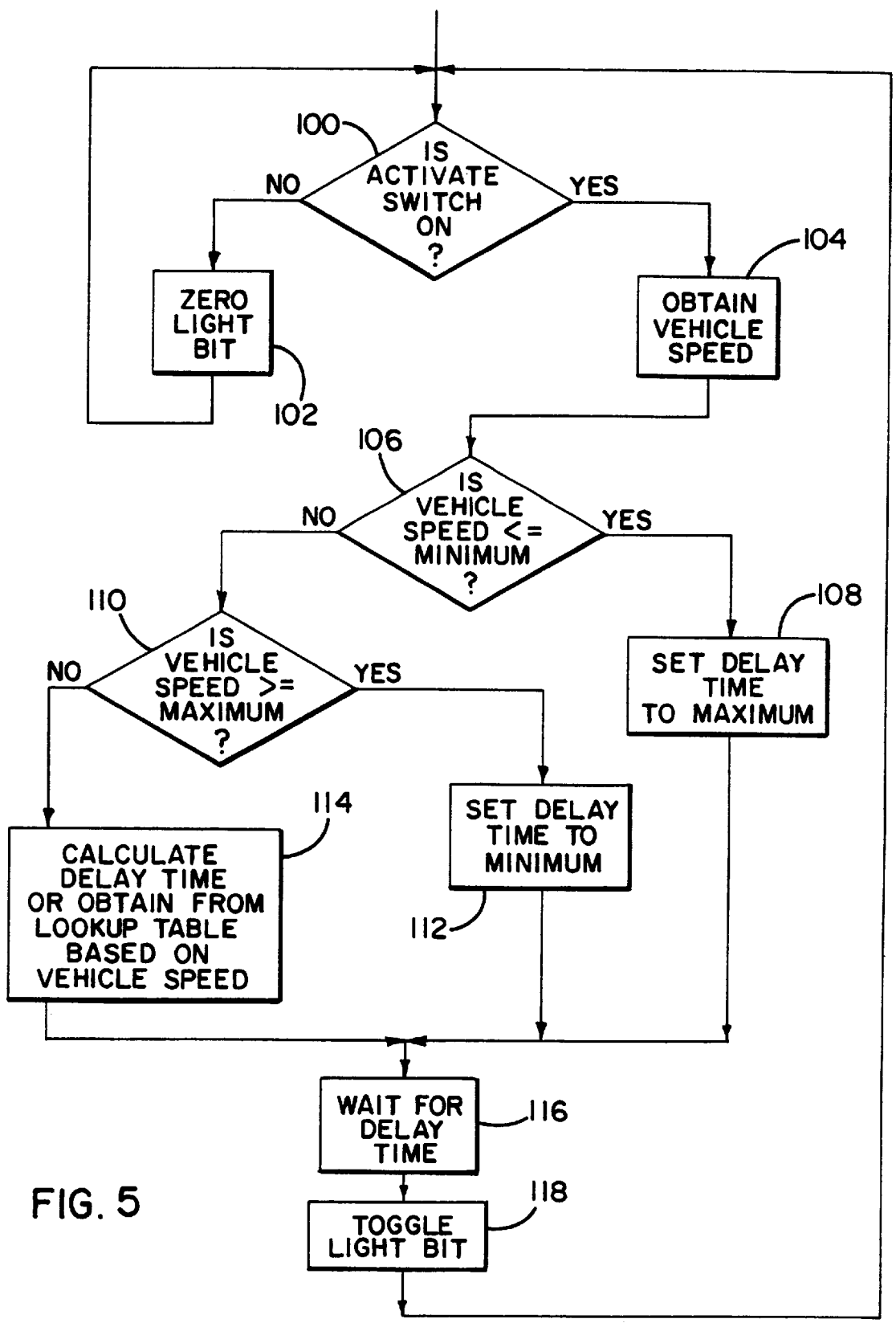
FIG. 5 is a flowchart illustrating the steps taken by the microprocessor of FIG. 4 to accomplish the invention.

In any event, once the proper voltage reading is obtained as digital data, at step 106 of FIG. 5 the microprocessor 60 compares the voltage data with a predetermined minimum value, either hard-coded into the executing program or stored independent of the program code in a non-volatile memory 68 operatively connected thereto. If the value is at or below the minimum, the microprocessor 60 sets a delay time variable equal to a maximum value (step 108).

For example, if the voltage is at 0.8 volts, corresponding to eight miles per hour, a 0.4 hertz minimum flashing frequency may be desired. Accordingly, a total delay time of 2.5 seconds is required (1.25 "On" and 1.25 "Off" assuming a fifty percent duty cycle). Thus, a delay variable is set that takes 1.25 seconds to decrement to zero within a loop. For example, if the execution time of a delay loop that decrements a register to zero takes 100 microseconds, then decrementing a register initially loaded with a value of 12,500 takes 1.25 seconds to reach zero and thereby exit the loop.

If however, the speed (as indicated by the voltage reading) is not less than or equal to the minimum speed, then the speed is compared to a maximum value at step 110. For example, if the voltage is at 7.7 volts, corresponding to 77 miles per hour, a 4.0 hertz maximum flashing frequency is desired. Accordingly, a total delay time of 0.25 seconds is required (0.125 "On" and 0.125 "Off" assuming a fifty percent duty cycle). Thus, the delay variable would be set (at step 112) that takes 0.125 seconds to decrement to zero within a loop. As in the above example, if the execution time of a delay loop that decrements a register to zero takes 100 microseconds, then decrementing a register initially loaded with 1,250 takes 0.125 seconds to reach zero and thereby exit the loop.

Figure 6:
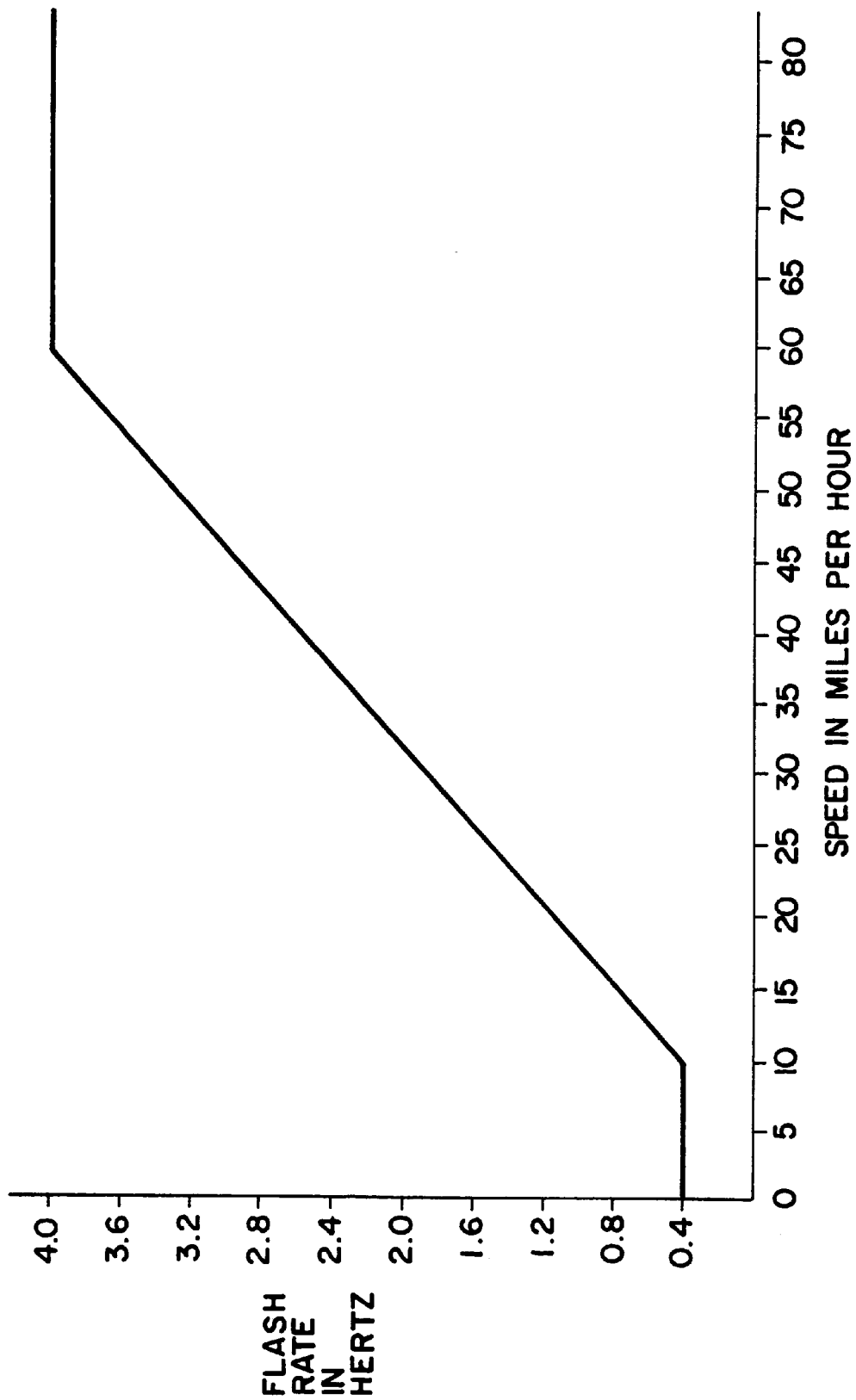
FIG. 6 is a graph representing the flash rate of the vehicle as a linear function of vehicle speed between minimum and maximum flash rates.

If the speed is neither at or below the minimum nor at or above the maximum, then the delay variable may either be obtained from a look-up table or calculated as shown in step 114. In the present example, if the frequency varies in direct linear proportion to the vehicle speed between the maximum (sixty miles per hour) and minimum values (ten miles per hour) then the function as represented graphically in FIG. 6 is obtained. Between the maximum and minimum values, the flashing frequency of FIG. 6 (inverse of total on plus off time) can be derived from the speed of the vehicle by executing the formula:

$$\text{frequency} = (0.072 * \text{speed}) - 0.32.$$

Accordingly, the on time (one-half times the inverse of the frequency, assuming a fifty percent duty cycle) is approximately obtained from the speed by executing the following formula:

$$T_{on} = 6.944 / (\text{speed} - 4.444).$$

Thus, if the speed detected equaled 35 miles per hour, then the variable would be set to delay for 0.2273 seconds. Continuing with the above example, to delay for this time in a 100 microsecond delay loop, the variable loaded into the decremented register must equal 2273.

Alternatively, the various required delay variables between the maximum and minimum speeds can be calculated in advance, and stored in a look-up table. For example, a corresponding value could be stored for every mile per hour difference, as shown in FIG. 8. Whenever the speed is obtained, the processor obtains the delay variable from the table by first rounding the speed to a value that corresponded to the resolution of the table, converting the value to an address of the appropriate memory location, and reading the value stored at that address.

If desired, a different linear function may be used to provide the formula or values in the look-up table. For example, to provide a repetition rate of 1.0 hertz at ten miles per hour that increases linearly up to 2.0 hertz at sixty miles per hour, the frequency can be derived from the speed of the vehicle by executing the formula:

$$\text{frequency} = (0.02 * \text{speed}) + 0.8.$$

Figure 7:
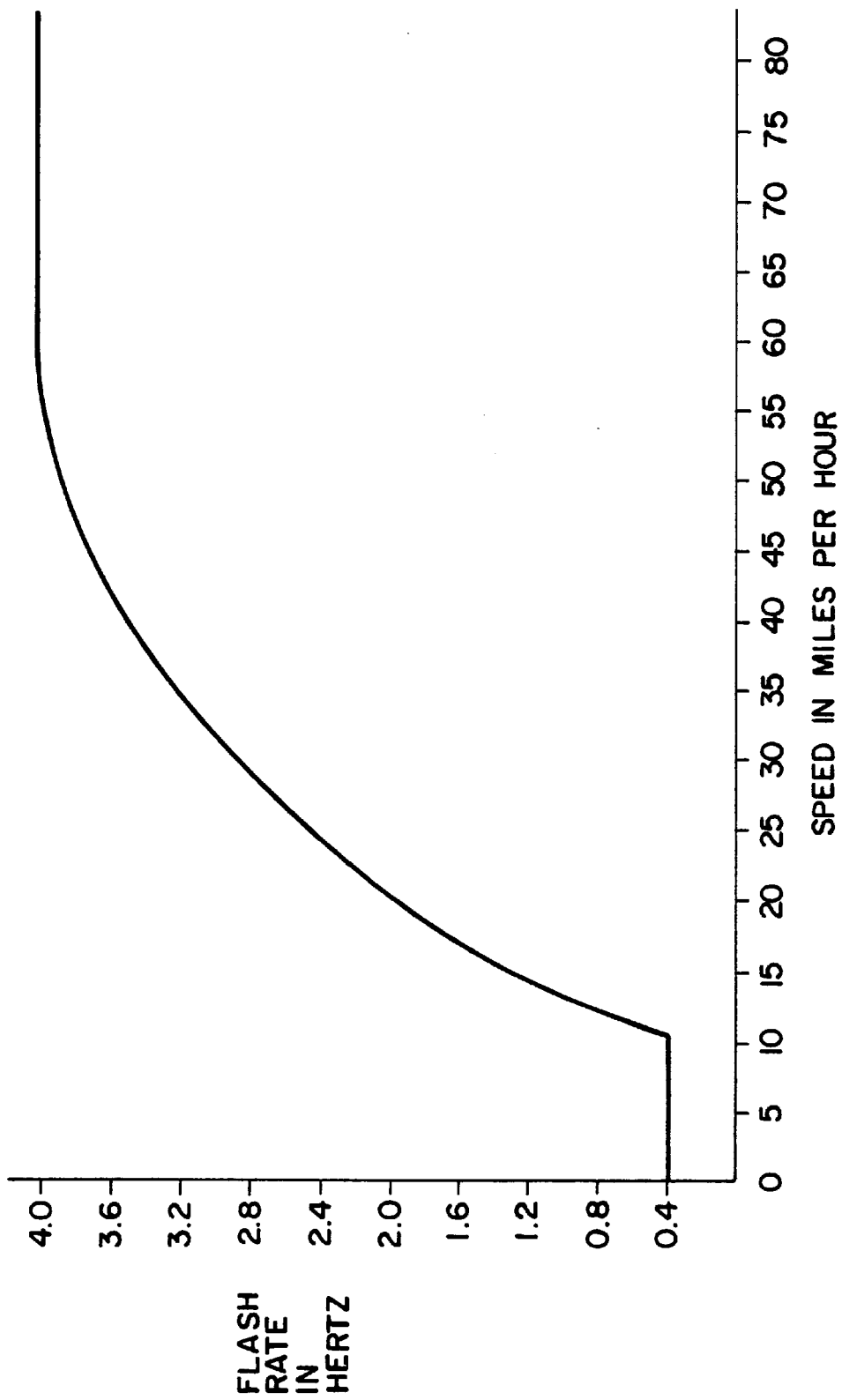
FIG. 7 is a graph representing the flash rate of the vehicle as a nonlinear function of vehicle speed between minimum and maximum flash rates.

Indeed, as shown in FIGS. 6 and 7, virtually any linear or nonlinear function can be utilized for corresponding the frequency of the flashing light with the speed of the vehicle. Thus, if it is found to be most effective to linearly increase the frequency between the minimum and maximum rates, such a result may be achieved with any of the circuits described herein. If instead it is desired to increase the frequency in a non-linear manner (exponentially, logarithmically, or by some other function), then an operational amplifier or the like arranged to output the desired voltage as a function of the input voltage would achieve the appropriate result in an analog circuit. If the microprocessor-based circuit of FIG. 4 is used, then altering the values stored in the look-up table (or the formula employed to calculate the values) provides the appropriate frequency as a function of vehicle speed.

In any event, once the delay value is obtained, the microprocessor 60 loops (or otherwise waits) for the appropriate delay time as shown in step 116 before toggling the output bit in step 118.

The variable speed signalling device 20 may alternatively comprise a sound source such as an audible tone generator connected to drive a speaker, horn, siren or the like. In such an embodiment, the sound source generates at least one audible tone that may be sounded and turned off intermittently. If two distinguishable audio tones are used, the tones can be alternately sounded, or swept between (for example like a musical portamento or glissando). For example, this may be accomplished by ramping a voltage into a voltage to frequency converter, and driving a speaker with the varying frequency. In this situation, the ramp rate is determined by the vehicle speed.

Figure 9:
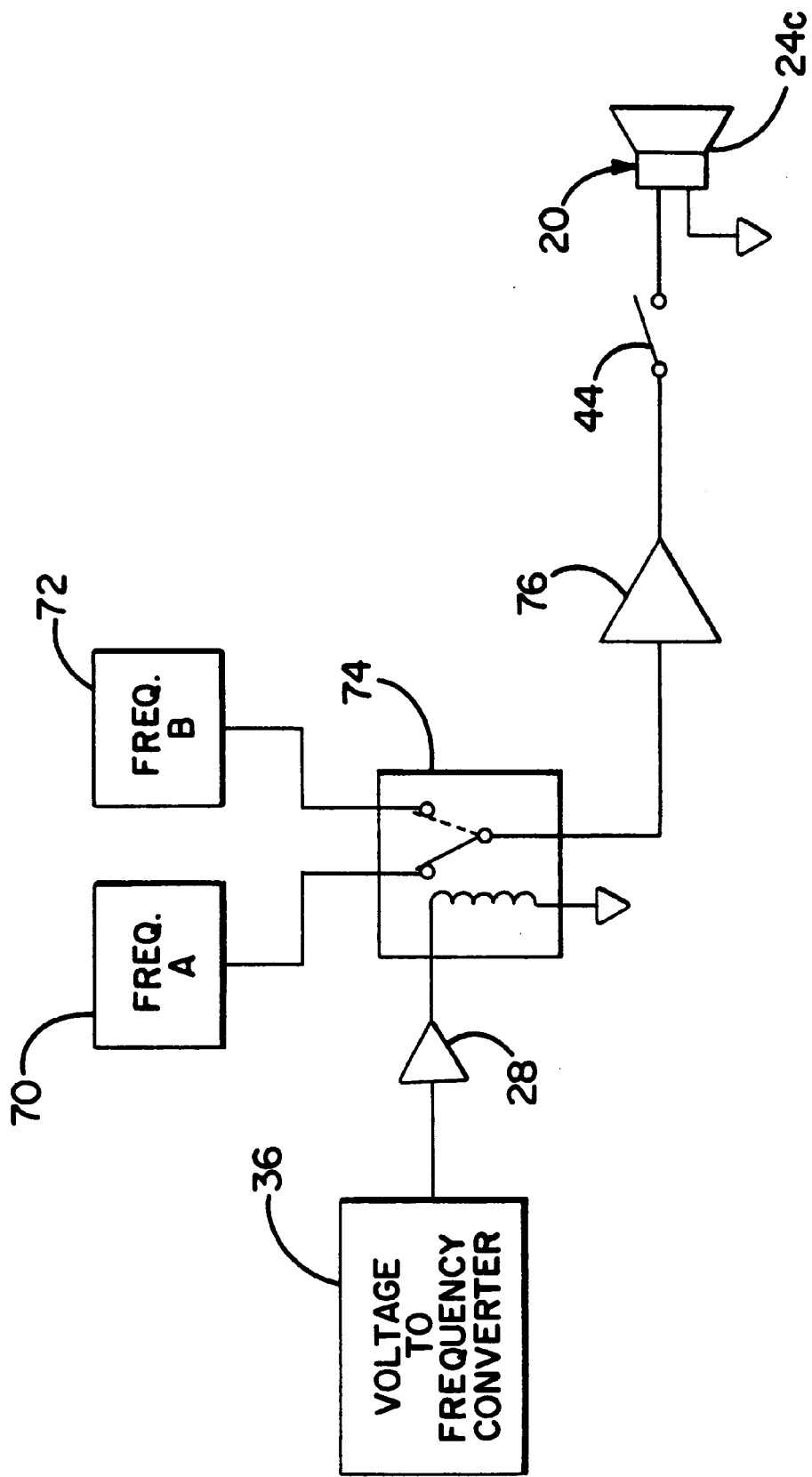
FIG. 9 is a partial schematic diagram illustrating circuitry for driving a speaker with alternating audible tones.

FIG. 9 illustrates two frequency sources (oscillators) 70, 72 arranged to drive a speaker in alternating tones wherein the rate of alternating therebetween depends on the speed of the vehicle. FIG. 9 assumes that the voltage output by the vehicle speed detector is clamped and otherwise made appropriately available as previously described with reference to FIGS. 1–3.

In keeping with the invention, the speed-dependent voltage is converted (by frequency-to-voltage converter 36) to a frequency for alternating between the sources. This frequency of alternation drives a relay 74 or the like via driver 28, which switches the relay contacts between a first oscillator 70 set at frequency A and a second oscillator 72 set at frequency B. As the relay 74 is driven, the outputs of the oscillators 70, 72 are alternately applied to an audio driver 76 or the like which drives the speaker 24c.

In accordance with the invention, the repetition rate of alternating, sweeping or turning the sound on-and-off varies in either direct or inverse proportion to the speed of the moving vehicle between minimum and maximum limits. It can be readily appreciated that the audio frequency of the tone (for example 440 hertz) or tones (for example 500 hertz to 1500 hertz) does not necessarily vary with the speed of the vehicle; instead, the repetition rate of switching or sweeping between the tones or turning a single tone on-and-off intermittently is what is varied.

Moreover, it is feasible to factor in the external driving conditions, such as dry, wet, icy, and so on when determining the signalling rate, for example by adding to the detector 32 output a small voltage when wet and a larger voltage when icy. This might be manually switched in by the driver or automatically sensed.

Figure 10:
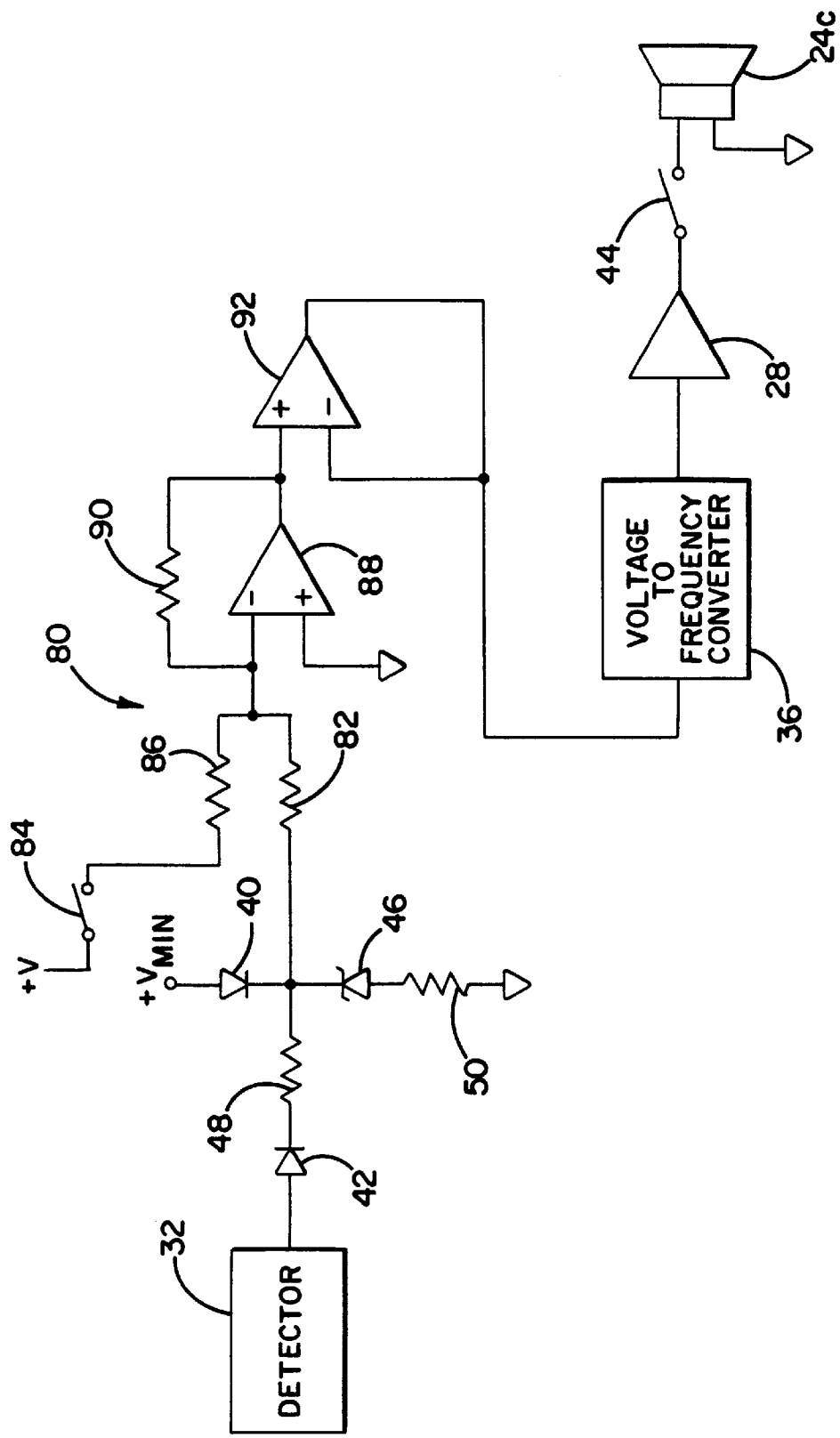
FIG. 10 is a schematic diagram of an electronic circuit employing analog circuitry having an adder circuit therein for selectively influencing the emergency signalling frequency.

FIG. 10 illustrates one circuit for selectively influencing the ultimate broadcast signalling frequency, such as for the purpose of slightly raising the frequency from its usual rate when conditions are icy. To accomplish the addition, a conventional operational amplifier-based adder circuit 80 is provided. For simplicity, the illustrated circuit presupposes that an appropriate negative voltage is available, but of course conventional biasing techniques may alternately be employed.

In any event, the voltage from the detector 32 is clamped between maximum and minimum values by diodes 40 and 46 as previously described, and fed into the adding circuit 80 through a resistor 82 of appropriate value. To add a voltage thereto, such as during icy conditions, a switch 84 is actuated to feed an augmented voltage into the adding circuit 80 through resistor 86. The switch 84 may be either manually or automatically actuated in response to a sensed external condition.

The currents resulting from the voltages through resistors 82 and 86 are fed into an operational amplifier 88 arranged with a feedback resistor 90 to act as a conventional adder. As is well known, the amount of gain or attenuation of each input depends on the ratio of the value of its input resistor, 82 or 84, relative to the value of the feedback resistor 90.

By way of example, for the input connected to the detector 32, a one-to-one ratio of resistor 82 to feedback resistor 90 renders neither gain nor attenuation, so the magnitude of the detector voltage is unchanged by the adder circuit 80. When the switch 84 is closed, a one-to-twelve ratio of resistor 86 to feedback resistor 90 adds one volt to the output of operational amplifier 88 if directly connected to twelve volts, i.e., the speed-dependent detector output voltage will be increased by one volt. However, since the output from amplifier 88 is in fact inverted, an inverting voltage follower 92 is provided to reinvert to positive voltage as needed.

Although this adder circuit 80 may be utilized in combination with any type of signalling means, such as the light sources 24a and 24b described in FIGS. 1–3 or the alternating frequency circuit of FIG. 9, the circuit illustrated in FIG. 10 uses the output frequency to drive a speaker 24c. As before, the voltage from the adder circuit 80 is converted to a frequency by voltage to frequency converter 36. In this particular embodiment, the output frequency is an audio frequency and the driver 28 directly drives the speaker 24c whenever switch 44 is closed.

Alternatively, in the microprocessor-based circuit of FIG. 4, the addition of voltage according to driving conditions is accommodated by including programming steps to add a value to the detected input voltage read in before the delay loop calculation or look-up is performed, or by subtracting a value from the delay-loop counter variable once obtained. Indeed, when the microprocessor-based circuit is employed, the flash rate versus vehicle speed curve can essentially be tailored to any desirable shape in accordance with the conditions. Moreover, with such a system, various lights, patterns and the like can further enhance the system.

For example, a police vehicle might have a blue light flashing at a fixed frequency and a white light flashing at a speed proportional to the speed of the vehicle. Since this provides a viewer with a reference rate, the speed of the vehicle is easier to determine at each moment. Duty cycle is also generally adjustable, for example to indicate direction (long on, short off if in front of viewer, short on, long off if behind viewer) and so on.

Finally, while the present invention has been described primarily with respect to signalling devices that are directly observable by humans, there is no intent to limit the invention to visible lights and audible tones. Indeed, the present invention contemplates any manner of broadcasting speed-dependent information from an emergency vehicle. Thus, the signalling device of the vehicle may be arranged to broadcast speed-dependent information on RF carrier frequencies for reception by a dedicated receiving device or the like. In this connection, commonly assigned U.S. patent application Ser. No. 08/286,624, filed Aug. 5, 1994, is hereby incorporated by reference.

As can be seen from the foregoing, a method and apparatus has been provided for increasing the effectiveness of emergency signalling devices on vehicles by varying the frequency of the device in dependence on the speed of the vehicle. The method and apparatus enables an observer to determine the speed of a vehicle by observing signals produced by the signalling device, which preferably vary between a maximum and minimum frequency rate.

What is claimed is:

1. An emergency lighting device for a motor vehicle, the device comprising, a flashing light, a light transmissive housing for and protecting the flashing light, a detector for detecting the speed of the vehicle, and circuitry responsive to the detector for controlling a flash rate of the flashing light so that the rate varies with both an increase and decrease in the speed of the vehicle in accordance with a predetermined relationship between minimum and maximum visibly discernable flash rates.

2. An emergency lighting device as set forth in claim 1 wherein the light transmissive housing is a light bar housing and the base includes a mounting apparatus for securing the emergency lighting device to a roof of the motor vehicle.

3. An emergency lighting device as set forth in claim 1 wherein the varying flash rate of the flashing light is linearly proportional to the speed of the vehicle between predetermined minimum and maximum speeds, and the detector includes means for detecting the minimum and maximum speeds of the vehicle.

4. An emergency lighting device as set forth in claim 3 wherein the minimum vehicle speed is approximately zero.

5. An emergency lighting device as set forth in claim 1 wherein the varying flash rate of the flashing light is related to the speed of the vehicle in a nonlinear relationship between predetermined minimum and maximum speeds.

6. The emergency lighting device as set forth in claim 1 wherein the circuitry is responsive to a user input for selectively modifying the predetermined relationship between the flash rate of the flashing light and the speed of the vehicle.

7. The emergency lighting device as set forth in claim 1 wherein the circuitry includes a microprocessor.

8. A method of operating emergency signalling devices secured to a motor vehicle, the method comprising the steps of, generating an emergency signal that is sensed by an observer as having a cyclical characteristic, maintaining a repetition rate of the cyclical characteristic of the emergency signal at a minimum value for speeds of the motor vehicle below a predetermined lower limit, maintaining the repetition rate of the cyclical characteristic of the emergency signal at a maximum value for speeds of the motor vehicle above a predetermined upper limit, where the cyclical characteristic is discernable to the observer at the maximum value, and adjusting the repetition rate of the emergency signal between the lower and upper limits in response to both increases and decreases in speed.

9. A method as set forth in claim 8 wherein the proportional relationship is a linear relationship.

10. A method as set forth in claim 8 wherein the proportional relationship is a non-linear relationship.

11. The method as set forth in claim 8 further comprising the step of varying the value of the repetition rate of the emergency signal from the proportional value in response to external driving conditions.

12. The method of claim 8 wherein the step of generating an emergency signal comprises the step of broadcasting an audible tone.

13. The method of claim 8 wherein the step of generating an emergency signal comprises the step of flashing at least one light.

14. An emergency signalling device for a vehicle, comprising, a signalling device on the vehicle for broadcasting emergency signals, a detector for converting the speed of the vehicle to a DC voltage having an amplitude that varies with the speed of the vehicle, circuitry for converting the DC voltage to a second electrical signal having a repetition rate corresponding to the speed of the vehicle, circuitry for maintaining the repetition rate between maximum and minimum rates, and means connecting the second electrical signal to the signalling device for broadcasting emergency signals having a repetition rate that varies with both increases and decreases in the speed of the vehicle between maximum and minimum repetition rates.

15. The device of claim 14 wherein the circuitry for converting the DC voltage to the second electrical signal includes a voltage-to-frequency converter.

16. The device of claim 14 wherein the signalling device comprises a speaker connected to a source of at least two distinct audio frequencies.

17. The device of claim 14 wherein the signalling device comprises a speaker alternately connected between at least two sources of distinct audio frequencies, and further comprising means for alternately connecting the sources to the speaker, wherein the rate of alternate connection therebetween is determined by the repetition rate.

18. The device of claim 14 wherein the circuitry for converting the DC voltage to the second electrical signal includes a microprocessor.

19. The device of claim 18 wherein the circuitry for converting the DC voltage to the second electrical signal further includes an analog-to-digital voltage converter having its analog input connected to the DC voltage and its digital outputs connected to the microprocessor for converting the DC voltage to the second electrical signal.

20. The device of claim 19 further comprising a memory operatively connected to the microprocessor, the memory having values stored therein corresponding to the repetition rate for a plurality of input voltages, wherein the microprocessor accesses the memory to convert input voltages to the second electrical signal at the corresponding frequency.

21. The device of claim 18 wherein the microprocessor includes the circuitry for maintaining the repetition rate between a minimum and maximum rate.

22. The device of claim 14 further comprising means for selectively connecting and disconnecting the second electrical signal to and from the signalling device.

* * * * *